Oct. 12, 1937.  E. K. JOHANSEN  2,095,816
FRICTIONAL MOTION CONTROLLING MECHANISM
Filed Sept. 11, 1936  2 Sheets-Sheet 1
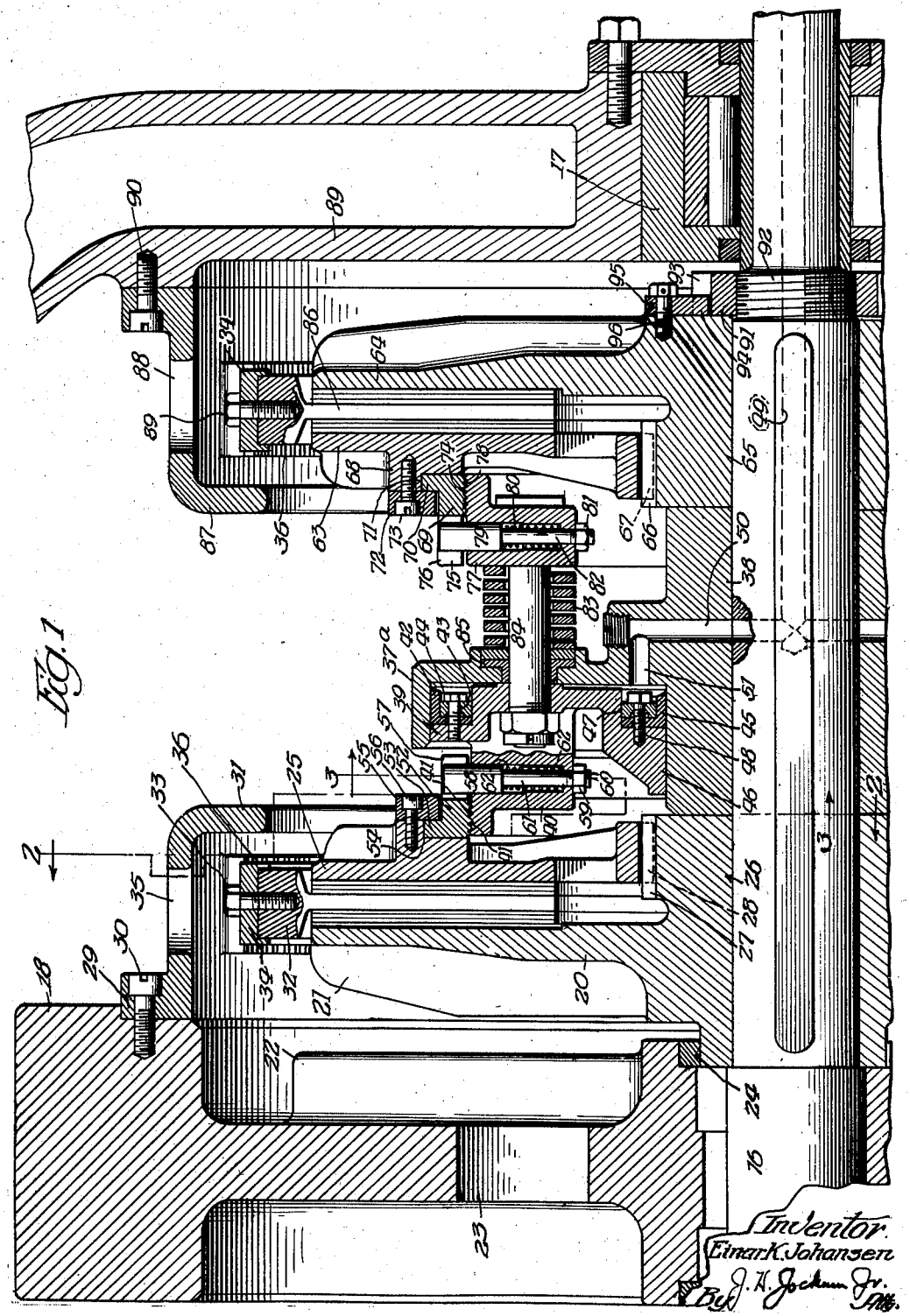

Oct. 12, 1937.  E. K. JOHANSEN  2,095,816
FRICTIONAL MOTION CONTROLLING MECHANISM
Filed Sept. 11, 1936  2 Sheets-Sheet 2
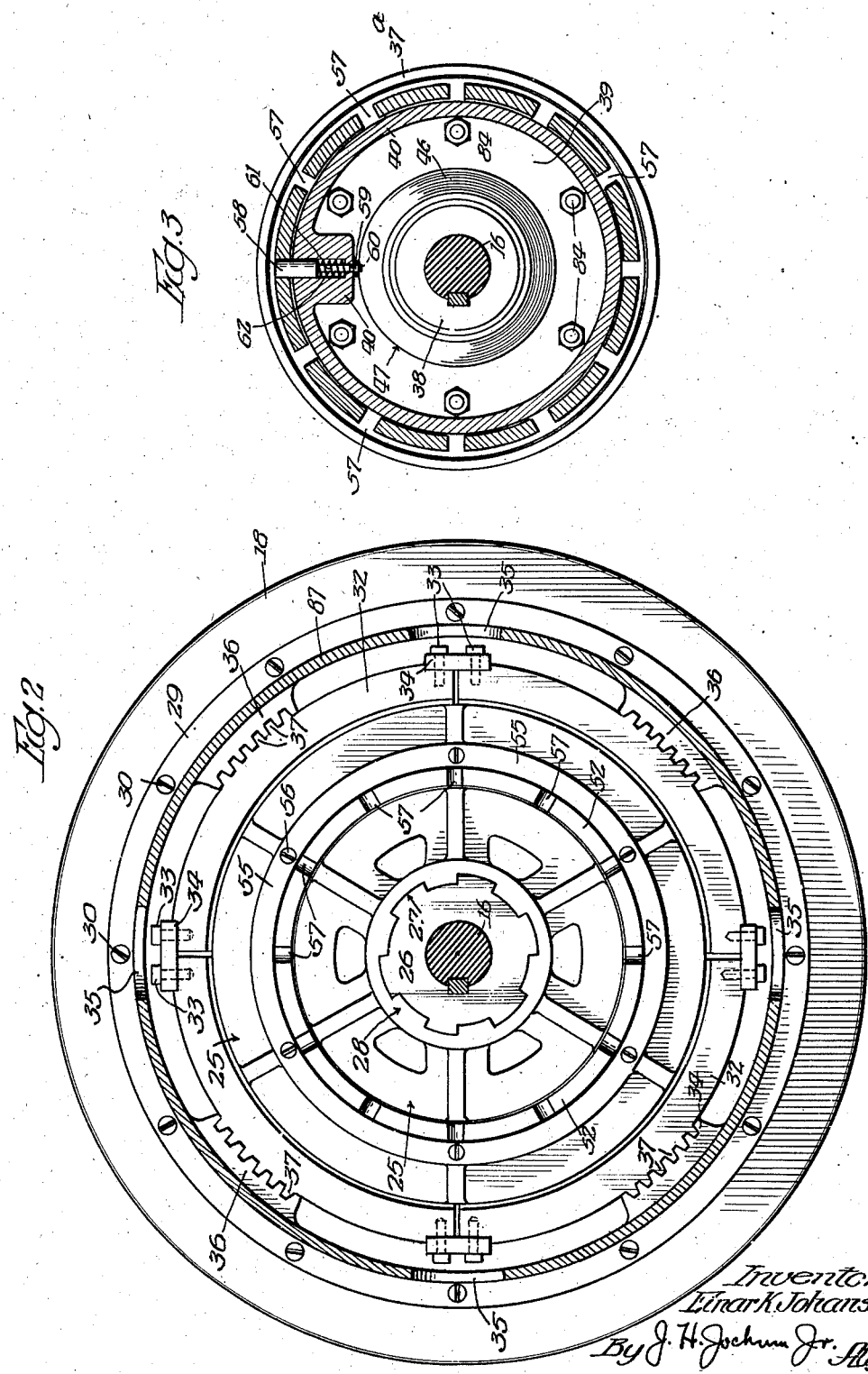

Patented Oct. 12, 1937

2,095,816

UNITED STATES PATENT OFFICE 2,095,816

FRICTIONAL MOTION CONTROLLING MECHANISM

Einar K. Johansen, Chicago, Ill., assignor to Clearing Machine Corporation, Chicago, Ill., a corporation of Illinois Application September 11, 1936, Serial No. 100,395

6 Claims. (Cl. 192—111)

In co-pending applications, Serial Number 32,996, filed July 25, 1935, and Serial Number 70,079, filed March 21, 1936, by Rudolph W. Glasner, there is shown and described a combined fluid pressure control clutch and brake, both the clutch and brake embodying a lining carrying member with which the respective frictional creating or gripping elements cooperate.

In said construction it is necessary when the lining becomes worn to adjust the parts to compensate such wear. In doing this, it has heretofore been necessary to loosen and remove a great number of screws before such adjustment can be made, and then after adjustment replace the screws.

It is one of the objects of the present invention to provide improved means whereby such adjustments can be rapidly effected without the necessity of removing such screws.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a vertical sectional view of a portion of a combined clutch and brake constructed in accordance with the principles of this invention.

Figure 2 is a detail sectional view taken on line 2—2, Figure 1, on an enlarged scale.

Figure 3 is a detail sectional view taken on line 3—3, Figure 1, on a reduced scale.

Throughout the specification and claims wherever the word "clutch" is employed, it is to be understood that such term is not to be considered as a term of limitation, as the invention is equally applicable to brakes, and the term "clutch" as employed is to be construed to also include a brake.

The invention will be particularly described in connection with a combined clutch and brake mechanism.

The shaft 16 constitutes the main drive and is journaled in suitable bearings, a portion of one of which is shown at 17. A fly wheel 18 constituting a driving element carries a clutch element, to be hereinafter described, and is mounted upon the shaft for free rotation with respect thereto, suitable bearings being preferably arranged between the fly wheel 18 and the shaft 16.

The fly wheel is continuously rotated in any suitable manner. The numeral 20 designates a clutch member which is secured to the shaft 16 for rotation therewith, in any suitable manner, such as by being keyed thereto or by any other suitable fastening device, and this clutch member may be provided with radial ribs or fins 21 which cooperate with ribs or fins 22 on the adjacent face of the fly wheel 18, openings 23 being provided in the web or body of the fly wheel in proximity to the fins for creating a current of air to flow over the parts.

A suitable packing gland 24 may also be provided between the fly wheel and the shaft.

Cooperating with the clutch member 20 is another clutch member 25 which is mounted preferably upon the hub 26 of the clutch member 20, and is adapted for lateral movement toward and away from the clutch member 20. To that end the clutch member 25 has a sliding connection with the hub of the clutch member 20, preferably by means of spaced projections 27 on the hub 26 of the clutch member 20 and interengaging projections 28 on the clutch member 25.

Supported by the fly wheel 18 is an annular member 29 secured in position in any suitable manner, such as by means of screws 30, and this member 29 may be provided with a circumferential flange 31, the member 29 being of a diameter considerably greater than the diameter of the clutch members 20—25.

Disposed between the clutch members 20 and 25 is a lining carrying member 32 preferably constructed in sections and connected together by screws 33 passing through suitable connecting plates 34, which span the adjacent edges of the sectors of the lining.

The annular member 29 may be provided with any desired number of openings 35 which are of sufficient size and are so disposed with respect to the screws or bolts 34 that access may be had to the latter through the opening 29. The annular member 29 is also provided on its inner face with a plurality of series of teeth or projections 36, the longitudinal diameters of which extend in general directions lengthwise of the axis of the lining carrying member, and the teeth are preferably of a substantial extent.

Similar teeth 37 are carried by each of the segments 32 of the lining carrying member and mesh with respective teeth 36 on the member 29.

The respective teeth being of substantial length permits the lining carrying member to have a lateral movement, such movement being of a limited nature according to the action of the clutch members 20—25.

The numeral 37a designates a cylinder which is provided with a hub 38 that is keyed to the shaft 16 for rotation therewith and with the clutch member 20. Within the cylinder 37ª is arranged a piston 39 provided with an annular projecting portion 40 having threads 41 about its periphery.

A packing gland 42 is provided for the piston 39 and is arranged within the cylinder 37ª, the gland being held in position by means of an annular member 43 held in position by means of screws 44. Another packing gland 45 may be provided to encompass the hub 38 between the hub 46 of the piston and the hub 38. The gland 45 being held in position by means of an annular member 47 and screws 48.

Fluid pressure is adapted to be supplied to the cylinder 37ª beneath the piston 39 from any suitable source through a channel 49 in the shaft 16 and through a passage 50 to a passage 51 that communicates with the cylinder 37ª.

The clutch member 25 is connected to the piston 39 to move therewith by means of an annular member or ring 52 having a flanged portion 53. The portion 52 is provided with threads adapted to engage the threads 41 on the projecting portion 40 of the piston 39. The flanged portion 53 is seated and moves within a recessed portion 54 in the clutch element 25, and an annular member 55 engaging the clutch element 25 and overlapping the flanged portion 53 of the member 52 holds these parts assembled, the annular member 55 being anchored or secured to the clutch member 25 by means of screws 56. Thus connected, the annular member 52 is adapted to be rotated with respect to the clutch member 25 and thereby adjust the annular member 52 with respect to the piston 39 in directions lengthwise of the axis of the piston.

The member 52 is provided with any suitable number of recesses 57 which open through the periphery thereof.

Arranged within the extending portion 40 of the piston 39 is a plunger 58 held against displacement by means of a nut or collar 59 screwed upon the threaded extremity 60 of the reduced portion 61 of the plunger. A spring 62 tends normally to project the plunger 58 so that it will enter one of the recesses 57 in the member 52.

Any number of these recesses 57 may be provided and may be spaced for any suitable distance. When it is desired to adjust the clutch member 25 with respect to the piston 39, any suitable implement may be employed and contacted with the end of the plunger 58 to depress the latter against the stress of the spring 62. This will unseat the plunger 58 with respect to the recess 57, and by means of the same implement and while it is inserted in the recess 57, it will not only hold the plunger 58 in an unlocking position, but the member 52 may be rotated and laterally adjusted with respect to the piston 39, and with it the clutch member 25.

A brake member 63 is provided and cooperates with the brake member 64 and is mounted upon the hub 65 of the brake member 64 for rotation therewith, but for longitudinal adjustment with respect thereto, the hub 65 and the brake member 63 being provided respectively with interengaging portions 66—67 movable one with respect to the other in directions lengthwise of the hub 65.

The brake element 63 is provided with a hub 68 to which an annular member 69 is secured. This annular member 69 is provided with a reduced or flanged portion 70 adapted to be seated in a recessed portion 71 in the hub 68, and an annular member 72 is secured to the hub portion 68 by means of any suitable number of screws 73, thus holding the annular member 70 so that it may be rotated with respect to the brake member 63.

The member 69 is provided with internal screw threads 74 and seats 75 in a laterally projecting flange 76.

The numeral 77 designates an annular member having external screw threads 78 adapted to engage the threads 74 on the annular member 69, and the annular member 67 is provided with a plunger 79 which is adapted to be projected by means of a spring 80, the plunger being held in position by means of a nut or collar 81 engaging threads on a reduced portion 82 of the plunger.

The plunger 79 is adapted to be seated in any one of the notches or recesses 75, any number of which latter may be provided, on the member 69 under the action of the spring 80.

When it is desired to relatively adjust the clutch member 63 with respect to the plunger 39, any tool or implement may be employed to contact the plunger 79 and depress the latter against the stress of the spring 80. When the implement enters the recess 75 and while the plunger is retracted, the member 69 may be rotated with respect to the brake member 63, thereby permitting a relative lateral adjustment of the brake member 63 with respect to the plunger 39.

A spring 83 of any desired strength encompasses a connecting bar or rod 84 which is secured to the plunger 39 and passes through the bottom of the cylinder 37, suitable packing 85 being provided to form a fluid tight joint.

The other end of the bar or rod 80 is secured to the annular member 77 in any suitable manner. The stress of the spring 83 is such that when either the brake member 63 or the clutch member 35 is in an active gripping position with respect to its cooperating element, it will retract the other or move it into inactive position. That is to say when fluid pressure is admitted into the cylinder 37 beneath the piston 39, the piston will be moved forwardly to move the clutch member 25 into contact with the friction member 32 and cooperate with the clutch member 20 to lock the fly wheel 18 to the shaft 16 for rotation together.

At the same time the bar or rod 84 will retract the brake member 63 and move it into inactive position and place the spring 83 under compression. As soon as the fluid pressure is relieved, the spring 83 will move the brake member 63 into active position and retract the clutch member 25 or move it into inactive position.

The brake members 63 and 64 cooperate with each other and with a friction creating element carrying member 86, the latter being preferably of a construction similar to the clutch construction and being supported by means of an annular member 87 having an opening 88, through which latter access may be had to the fastening screws 89 that secure the sections of the brake lining element together.

The member 87 is supported by a stationary portion 89 of the machine and is secured thereto by means of fastening bolts 90.

The brake member 64 is secured to the shaft for rotation therewith in any suitable manner but preferably through the medium of a collar 91 which is threaded onto the portion 92 of the shaft 16. This collar is provided on its periphery with the portions 93 which interengage with portions 94 on an annular member 95 that is secured to the brake member 64 by means of suitable screws 96.

It will thus be seen that when fluid pressure is admitted to the cylinder 37 to cause the clutch members 25 and 20 to become active, the brake members 63 and 64 will become inactive with respect to each other and the spring 83 will be placed under stress. As soon as the fluid pressure is relieved the spring 83 will cause the brake members 63 and 64 to cooperate to become active while the clutch member 25 will be moved into an inactive position with respect to the clutch member 20.

Should the parts of the brake or clutch which creates the friction become worn and it is desired to compensate such wear, the clutch member may be laterally adjusted with respect to the piston 39 by means of an implement inserted in the recess 57 to depress the plunger 58, after which the member 52 may be rotated and the threaded inter-connection 41 between the member 52 and the portion 40 which is connected to the piston 39 will be relatively adjusted, such adjustment continuing until another one of the recesses 57 is in a position to receive the plunger 58. Preferably only one of such plungers is employed.

Similarly, the brake member 63 may be laterally adjusted with respect to the piston 39 by inserting an implement in the recess 75 to depress the plunger 79. The annular member 79 may then be rotated and by reason of the threaded connection 74—78 between the member 70 and the member 77, this lateral adjustment will be effected and such adjustment may continue until another recess 75 is in a position to receive the plunger 79 when the latter is released.

With this invention it will be manifest that in order to compensate the wear of the parts of the frictional motion controlling elements, it is not necessary to remove a great number of screws or bolts as in the prior constructions before an adjustment can be effected and after which the screws or bolts must then be replaced. All that is necessary with the present invention is to employ some implement to depress the locking plunger to move it out of its receiving notch or recess, and the annular member 52 or 69 may be rotated while the other parts remain stationary, thereby effecting a lateral adjustment of the frictional motion controlling element to compensate any wear. After the adjustment the plunger will seat itself in another one of the recesses 75.

The length of the recesses being considerably greater than the cross sectional diameter of that portion of the plunger which is seated therein, considerable latitude will be given, permitting adjustment of the parts and at the same time insuring that the locking plunger will enter the seats, in any relative position of the parts which are to be locked by the plunger.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. Frictional motion controlling mechanism embodying cooperating friction members one of which is movable towards and away from the other, means for thus moving the last said member, a connection between the last said member and said moving means, said connection embodying an annular element secured to one and an element secured to the other of the last said member and said moving means, said elements having threaded connection whereby upon rotation of one of the elements with respect to the other the distance between said movable member and said moving means will be varied, there being a plurality of radially arranged locking member seats in one of said elements having an open s'de, and a spring controlled locking member carried by the other of said elements adapted to enter one of said seats to lock the elements against relative adjustment, said locking member adapted to be depressed by an implement inserted in the seat, said implement serving to rotate one of the elements with respect to the other when the locking member is depressed.

2. In combination two cooperating friction creating members, one of which is movable towards and away from the other, means for thus moving the said movable member, a connection between the last said member and the said moving means, embodying an annular element rotatably carried by one, and an element carried by the other, said elements having a threaded connection, said annular member provided with a plurality of radially arranged locking member receiving seats, a locking member carried by the other of said elements and adapted to enter a predetermined one of said seats upon rotation of said annular member, said locking member adapted to be retracted to unseat the same to permit the annular member to be rotated with respect to its supporting member and with respect to the other of said elements, the cross sectional diameter of the portion of the locking member which enters said seat being considerably less than the width of the seat to compensate relative adjustment of the parts.

3. In combination a friction creating member movable towards and away from its cooperating member, an element, means for securing the said element to the friction member whereby the element may be rotated with respect to its supporting friction creating member, the said element provided with a laterally projecting annular flange having a plurality of radially arranged seats opening through the lateral edge of the flange, means for moving the friction member, a connection between said moving means and said element, an element connected with said moving means and having threaded engagement with the first said element, and a locking member carried with the element that is connected with said moving means and movable transversely of the axis of said annular element to enter one of said seats to lock the elements against relative rotary movement.

4. In combination a friction creating member movable towards and away from its cooperating member, an element, means for securing the said element to the friction member whereby the element may be rotated with respect to its supporting friction creating member, the said element provided with a laterally projecting annular flange having a plurality of radially arranged seats opening through the lateral edge of the flange, means for moving the friction member, a connection between said moving means and said element, an element connected with said moving means and having threaded engagement with the first said element, and a locking member carried with the element that is connected with said moving means and movable transversely of the axis of said annular element to enter one of said seats to lock the elements against relative rotary movement, said seats being of a greater length than the cross sectional diameter of the portion of the locking member that is seated therein.

5. In combination a laterally movable friction member, an actuating member therefor, a connection between the members, said connection embodying an annular element, means securing said element to one of said members, said securing means operable to allow rotation of said element with respect to its supporting member, an element connected with the other of said members, said elements being threaded together for relative rotation and adjustment, a spring controlled locking member carried by one of said elements and adapted to enter seats in the other element to lock the elements against relative rotation, said locking member adapted to be moved out of the seat by an implement inserted into the seat and by means of which implement the elements may be relatively and rotatably adjusted when said locking member is unseated.

6. In combination a laterally movable friction member, an actuating member therefor, a connection between the members, said connection embodying an annular element, means securing said element to one of said members, said securing means operable to allow rotation of said element with respect to its supporting member, an element connected with the other of said members, said elements being threaded together for relative rotation and adjustment, a spring controlled locking member carried by one of said elements and adapted to enter seats in the other element to lock the elements against relative rotation, said locking member adapted to be moved out of the seat by an implement inserted into the seat and by means of which implement the elements may be relatively and rotatably adjusted when said locking member is unseated, said locking member operating transversely of the axis of said annular member, said seat being of a depth considerably greater than the cross sectional diameter of that portion of the locking member which enters the seat, whereby any relative adjustment of said elements may be compensated for with respect to the entering of the locking member into the seats.

EINAR K. JOHANSEN.